July 7, 1936.  J. G. THOMAS  2,046,756
METHOD AND APPARATUS FOR RECOVERY AND TREATMENT OF SLUDGE
Filed June 17, 1931  2 Sheets-Sheet 1
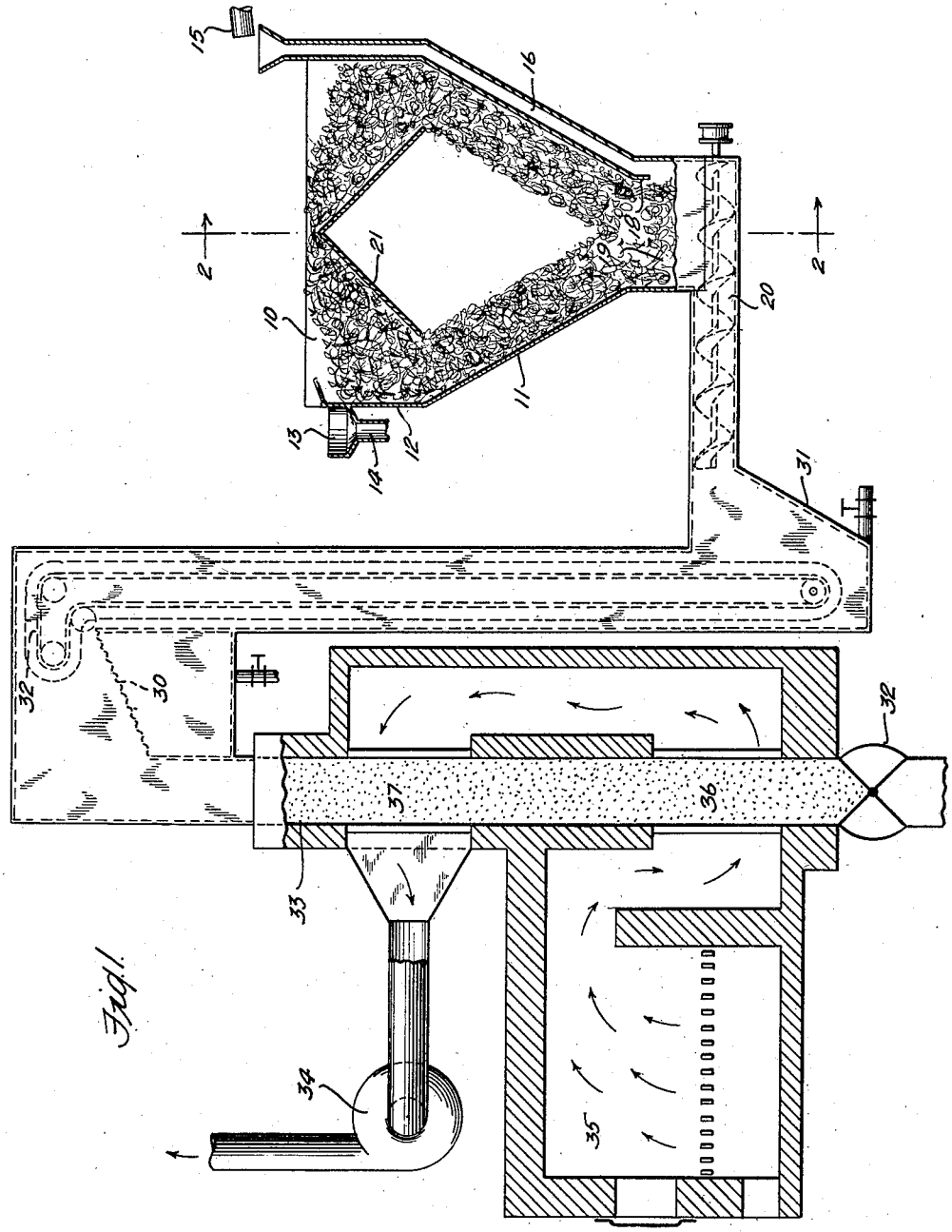
INVENTOR
JOHN G. THOMAS.
BY ATTORNEYS

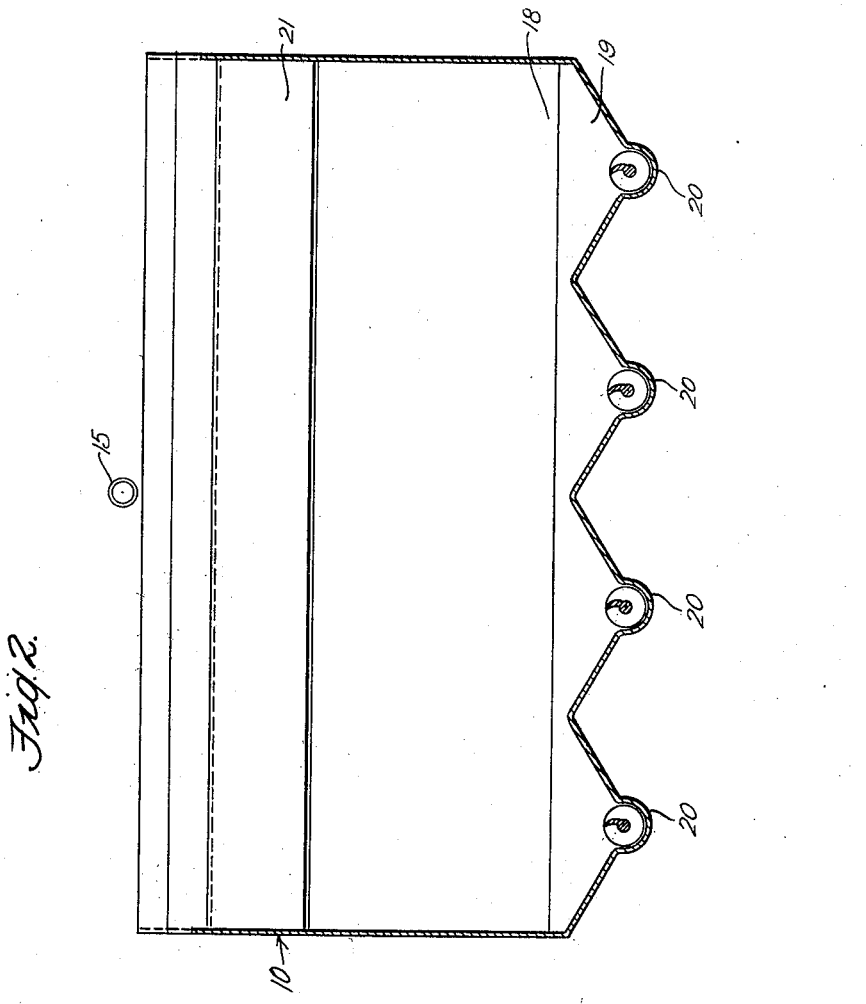

Patented July 7, 1936

2,046,756

UNITED STATES PATENT OFFICE 2,046,756

METHOD AND APPARATUS FOR RECOVERY AND TREATMENT OF SLUDGE

John Gordon Thomas, New York, N. Y.

Application June 17, 1931, Serial No. 544,962

3 Claims. (Cl. 210—2).

This invention relates to a method and apparatus for treatment of liquids containing suspended solids such as sewage, trade wastes and the like, and particularly to a method and apparatus adapted for the purification of such liquids, the segregation of sludge therefrom in concentrated form and particularly distributed on a carrier material so that the mixture is adapted for ready handling during subsequent sludge treatment operations, and the disposal of such sludge.

Prior to my invention, it has been common practice to separate the entrained organic and other foreign matter from the sewage by settling methods, e. g., a passage of the sewage at low velocity through settling tanks in which the sludge is gradually concentrated in a part of the tank out of the line of flow of the sewage. It has also been common practice to pass the sewage through a filter, the pores and interstices of which are adapted to permit passage of the liquid, but to restrain at least a substantial portion of the entrained matter. Thus, sewage has been passed through filter beds made up of sand, gravel, coke, and other material, in finely divided form, and in relatively coarse form, so that a porous bed results, which, either immediately, or after the formation of a mat of the coarser entrained matter, will have such fine openings as to hold back upon its surface all but the finest material. In filters of this type, the pores and interstices soon become clogged, so that the filter itself becomes inoperative, and it is necessary, at frequent intervals, to discontinue the operation of the filter and either remove the clogged portion of the filter bed or, by loosening the upper portion, to open up new pores through the filter surface. Either treatment tends to stir up the fine colloidal and sludge matter, and to cause some of it to pass on into the more open parts of the filter from which a substantial portion may be washed into the effluent when the filter is again placed in operation. In all of these methods, the sludge which is currently separated is mingled with and inoculated by sludge which has long stood in the settling chamber or on the filter. As a consequence, putrefaction sets in almost immediately, with resulting odor nuisance and liquefaction of the sludge, making its subsequent removal and/or concentration difficult and uneconomical.

Beds made up of larger pieces of "ballast", ordinarily crushed rock have also been used as contact beds or as "trickling filter" beds, in both of which reliance is placed upon biological activity on the surfaces of the ballast to oxidize the organic matter of the sewage. Any separation which may occur in such bed is accidental. Some organic matter may accidentally be retained for some time upon the ballast, but this is against the wishes of the operator and designer, and if the filter is properly operated, such organic matter will leave the beds later, either in the spring or fall, or both. In both "contact" and "trickling filter" beds aeration is essential and the rate of flow is limited by the necessity for circulating air into the beds and also by the rate of action of the organisms which are relied upon for the oxidation. Such beds also result in serious nuisance, particularly in the production of filter flies, and of objectionable odors. With treatment of this kind, there is no thought of mechanical separation of sludge, but only of biological destruction without mechanical separation.

With these and other methods of treating sewage, including other methods of digesting organic matter of the sewage, a satisfactory separation and/or purification can be obtained, but the space required and the capital investment are so great in proportion to the amount of sewage handled that the state of the art must still be considered quite unsatisfactory.

The problem is rendered more acute by the rapidly increasing concentration of population in large cities, since accompanying a tremendous increase in the volume of sewage is an equally tremendous increase in the value of land, so that the cost of sewage disposal plants which require large areas for filter beds or for settling or digesting tanks is rendered almost prohibitive. The necessity for treating sewage in populous districts also renders the odor problem more acute.

One object of the present invention is, accordingly, to reduce the land area and the equipment cost required for treatment of sewage. Another object is to increase the efficiency of removal of the entrained matter from the sewage. Another object is to recover the sludge from the separation treatment in a form which adapts it for ready treatment to destroy it or convert it into other useful products. Another object is to effect the recovery and disposal of sludge without nuisance of any kind.

I have now discovered that these objects may be attained and other advantages may be secured if a deposition bed composed of large pieces of carrier material is moved as a body so as substantially to prevent disturbing the interrelation of the pieces of carrier material within the bed.

I am unable certainly to state the cause of this increased efficiency. It seems likely, however, that the suspended matter as it contacts with the carrier material tends to be held thereon, provided the velocity of the liquid is low enough to avoid washing it back into the stream. So long as the bed is moved en masse without disturbing the individual pieces of the carrier material, and so long as the proper velocity of flow is maintained, the entrained matter which is deposited will remain undisturbed on the carrier material. If, however, the individual pieces in the bed are disturbed, the settled sludge, etc., is likely to become dislodged and to be washed back into the effluent.

During continued use of this bed, a stratification occurs, the sludge being heavily deposited at spaced levels and between these levels the interstices remain relatively free from sludge. After a time, the layers near the inlet of the influent form, in effect, sewage mats which may contribute a desirable filtering action, but if operation is continued long enough without changing the bed, these mats will eventually become clogged to the point where the efficiency of continued operation is impaired.

Following the process of this invention, the carrier material of which the bed is made may be removed one layer at a time from the inlet end thereof, preferably as its interstices become objectionably filled, without seriously disturbing the remainder of the bed, and thus advantage may be taken both of the filtering action of the sewage mats and of the novel deposition action of the remainder of the bed. As one sewage mat becomes excessively clogged it may be removed and the next layer with its interstices already filled with deposited sludge is ready almost immediately to assume the filtering function. Fresh carrier material added near the outlet for the effluent not only replenishes the bed, but serves also to prevent escape of any odors emanating from the beds.

It has been established by experimental evidence that a separation of this type, in which the bed of carrier material is moved en masse produces a more efficient and complete separation of suspended matter and/or settable solids than with other known types of separation, is more easily operated and controlled, and does not create any nuisance.

In the accompanying drawings, I have illustrated one preferred form of the invention.

Fig. 1 shows an elevation partly in section; and

Fig. 2 a cross section taken on line 2—2 of Fig. 1.

The apparatus as illustrated in the drawings consists of a deposition chamber 10 having a lower portion 11 with the sloping sides and an upper portion 12 with vertical sides. Along one of the upper edges of the vertical portion 12 is a channel or trough 13 adapted to receive the effluent as it flows over the edge of the tank and to conduct it to the inlet 14 of another similar unit, or to an outlet.

The influent from the pipe or other conduit 15 is passed into the chamber 16, from which it enters the bed 17 of carrier material through the opening 18.

Beneath the opening 18 is a well 19, into which the carrier material, with the sludge deposited thereon, settles, and from which it is removed by the conveyor 20.

In the present case, I have shown a long rectangular tank 10, and, for more efficient removal, this tank and a plurality of conveyors 20, each with a converging well 19, are provided. It will be understood, however, that many other means and arrangements for removing the mixture of sludge and carrier material may be provided. It is advantageous, however, regardless of the particular means for removing the sludge and carrier material, to provide a settling well beneath the point at which the influent enters the deposition bed, since by this arrangement it is possible to obtain a greater concentration of sludge in the mixture removed.

In Fig. 2, I have shown an angular baffle 21. This baffle is arranged with its edges spaced from the sloping sides 11 of the deposition chamber 10, and with its own sides sloping sufficiently to insure the passage of the carrier material along its surface by gravity, so as to feed the carrier material as required to maintain a sloping bed on the sides 11 of the deposition chamber.

The slope of the sides 11 is advantageously chosen substantially equal to the talus slope of the carrier material, that is to say, equal to the slope which a pile of the carrier material will maintain without relative movement or readjustment of its parts. Thus the material which passes between the edge of the baffle 21 and the side of the chamber 10 is moved by gravity along the sloping sides 11 without relative movement of the pieces of carrier material within the bed.

Thus it will be seen that the baffle 21 serves to establish a sloping deposition bed on the sides 11 which will be maintained with the addition of fresh material to the top of the chamber and the removal of used material from the bottom of the chamber. This baffle, however, serves also to prevent the breaking through of the filter with consequent deterioration of the effluent. Clogging of the deposition bed near the inlet 18 may result in the full pressure of the influent against the deposition bed, and this pressure, in the absence of a baffle such as that shown at 21, might break through the center of the bed, and thereby not only stir up the sludge which had previously settled upon the disturbed portion of the bed, but also carry this sludge out through the center of the bed into the effluent. This is prevented by the baffle 21, which prevents the pressure from breaking through at the center. I have found, accordingly, that by use of such a device, the removal of the carrier material from the bottom of the chamber may advantageously be regulated according to the head on the influent, and that when so regulated, a greater concentration of sludge on the carrier material is obtained.

The size of the pieces of carrier material is an important factor in the operation of this apparatus. Although I have found that the size may vary over a considerable range, the pieces should be of sufficient size to permit ready flow of the sewage through the bed and substantially to avoid capillary action between the pieces of material. If the pieces of which the bed is made are too small, the bed will be subject to excessive clogging and the stratification will not form satisfactorily. On the other hand, the use of pieces which are too large will unnecessarily increase the size of the apparatus, both because of the decreased ratio of surface to volume of the carrier material, and because of the increased ratio of voids to carrier material, and furthermore, too great an increase in size will result in a decrease in efficiency. The size which thus far I have found most desirable is about 1 inch to 2 inches in diameter. I have found that it is desirable to have the pieces of the bed of fairly uniform size throughout the bed, e. g., pieces which will pass a 1½ inch or 2½ inch screen and will be held on a ¾ to 1½ inch screen.

Many different materials may be used as carrier material in the method and apparatus of my invention. The most satisfactory materials which I have found thus far are slag or other similar furnace residue, preferably, "honeycomb" slag. I am aware, however, that many other materials may be used.

It is preferable to use a material having a coarse, rough surface, and preferably having some porosity, or honeycomb structure, as in the case of slag, broken brick, pumice, coke, etc.; and materials which have a rough fracture are apparently better for the purpose of this invention than materials which have a glassy fracture. The material chosen should have sufficient mechanical strength to withstand the pressure and the rough handling to which it is subjected while it is being supplied to the deposition bed, and while it is being utilized in the deposition bed, and preferably should be able to withstand the treatment to which it is subjected during the removal and subsequent operations for the conversion or destruction of the sludge. I have found that, for example, with the use of slag, the material may be reused many times in the deposition step, and after each deposition step may be subjected to a treatment such as the combustion treatment set forth in the co-pending application of John Gordon Thomas, Serial No. 536,704, filed May 12, 1931.

In the operation of the apparatus as just described, the carrier material is filled in to the top of the chamber 10 and flows down over the edges of the baffle 21 and along the sloping sides 11 to the bottom of the chamber. Beneath the baffle 21, an open space will be left and the two sloping beds on the two sloping sides 11 will converge above the inlet 18. The sewage flowing into the bed from the inlet 18 may thus spread out into the bed 17, and may even pass through the upper surface of the bed into the space beneath the baffle 21. There is, however, little tendency to short-circuit by passage through this space, because the diagonal distance through the bed to the open space and back again in order to pass beneath the baffle is little, if any, less than the distance through the bed itself. When the sewage has passed the edge of the baffle 21, it spreads rapidly, with decreasing velocity until it reaches the upper edge of the deposition chamber 10, from which it overflows into the channel or trough 13.

In the moving bed, particularly beneath the edges of the baffle 21, the action is quite novel. Examination of this portion of the bed during operation discloses the fact that stratification occurs transverse to the direction of flow, that is to say, that there will be a layer in which a heavy deposition of sludge in the interstices has occured, and a layer above in which comparatively little deposition has taken place; above that will be another layer showing heavy deposition, and another layer with less deposited sludge, and so on. The reason for this stratification is not entirely clear, but is probably caused by the segregation of the suspended solid particles in the progressive process of straining. Whatever the explanation, the importance of maintaining the bed undisturbed has been demonstrated by experience with this novel type of separator.

For the formation and maintenance of this desirable stratification, it is important properly to control the velocity of flow of the liquid through the bed. For best results the rate of flow should not greatly exceed 300 gallons of sewage per cubic foot of carrier material in the bed per day. It is, however, an advantage of my invention that below this velocity a wide variation in velocity will be tolerated without impairing the efficient action of the bed.

I have found that unless some of the carrier material is removed from the bed from time to time, the deposited sludge will eventually so far fill the voids between the pieces of carrier material as very materially to impede the flow of sewage through the bed. I have found that advantage may be taken of this fact by controlling the progressive renewal of the deposition bed so as substantially to maintain a pre-determined head on the influent. This control may be automatic, as for example by means of a float-controlled switch in the operating circuit of the conveyor 20. Or, if the plant is of adequate capacity, it may be desirable always to remove the sludge-bearing carrier during the hours of minimum flow each day, or even once in several days.

I have found that it is very desirable that the renewal of the deposition bed should be progressive, since a heavy deposit of sludge will be deposited upon the carrier material near the point of entrance of the influent before the carrier material near the point of exit of the effluent is too heavily charged with sludge. This progressive renewal may, in some cases, be continuous or it may advantageously be by the removal of one or more of the layers of the stratification and addition of fresh material at suitable intervals. These intervals may be short or they may be as long as one, or even several days. Thus, with sewage containing 350 to 400 R. P. M. suspended solids, for instance, such a deposition bed may be operated efficiently with a partial renewal once every day. By this progressive removal and renewal, the bed is gradually moved from one end to the other preferably counter to the flow of the sewage.

Where the sewage contains a considerable amount of finely divided suspended solids and/or colloidal matter, it will often be advantageous to treat the sewage with chemical coagulants, such as ferric chloride, ferrous sulphate, ferric sulphate, aluminum sulphate, calcium hydroxide, chlorine, etc. This treatment may be done either before, after, or during the treatment in the deposition beds. Advantageously, the treatment may occur between the first and second, or second and third, etc., units of a series through which the sewage is passed, and advantageously the chemical flocculation may be effected in the presence of finely divided substances capable of forming nuclei to which the materials effected by the precipitants may adhere such as, for example, infusorial earth, finely divided carbon (which may be carbon obtained by thermal decomposition of the sludge), fine ash, precipitated sludge, activated sludge, etc. Such materials which are advantageously of a particle size adapted to serve as such nuclei for the growth of flocs of the precipitated finely divided suspended solids and colloidal matter, assist in purification and settling by being readily dispersed in the liquid, and thereafter settling fairly rapidly and carrying down with them the flocculated material.

The mixture of sludge and carrier material which is removed from the bed may be treated in any desired way to convert it into products which are useful or unobjectionable or dispose of it in any expedient way. I have found, however, that the separation of sludge according to the process herein disclosed is especially advantageous when combined with the sludge disposal treatment described in the co-pending application of J. G. Thomas, Ser. No. 536,704. Accordingly, I have shown diagrammatically in the drawings a calcining apparatus for treating the sludge according to that process. This part of the apparatus is not claimed herein per se, and need not be described in detail, but consists broadly of a draining screen 30, to which the material is raised from the well 31 by means of the conveyor 32, a calcining shaft which receives the material as it falls from the screen 30, and a suction fan 34 which draws hot gases from the furnace 35, first through the calcining stack in the calcining zone 36, and again through the drying zone 37.

The gases and vapors which are drawn from the drying zone by the suction fan 34 may advantageously be passed first through a spray tower, in which they are cooled by means of a water spray, and condensed, and by which entrained solids and liquids, as well as some soluble gases and vapors are washed therefrom; and the washed gases may then be passed through a fire, e. g., by mixing with sufficient air to support combustion, and passing through a coal or other fire bed. Such gases may also be passed through materials which absorb or adsorb, or chemically destroy a part of the ingredients; for this purpose chemicals, activated carbon, oils, etc., may be used. In many cases, it will not be necessary to subject the gases from the suction fan to any such treatment, since the slight odors contained therein may be unobjectionable, particularly if discharged from a tall stack. In other cases, a spray treatment, for example, such as is described in my co-pending application, Serial No. 536,704, will be sufficient, and in other cases, the fire may be used alone and without the preliminary spraying treatment. Ordinarily, the spray treatment results in economy because of the large amount of water which is condensed from the gases, and which, therefore, need not be heated in the fire bed. If, however, the gases and vapors discharged from the fan 34 contain sufficient combustible material, the fuel value of the combustible vapors may supply the heat required for raising the temperature of the water vapors.

In this combined operation, the fact that the removal of sludge according to the process herein disclosed is rapid and without contamination by partially decomposed sludge, results in the removal from the bed of a mixture which will drain more freely than any fresh or partially digested or decomposed sludge, and furthermore, such mixture is so far free from objectionable odors as ordinarily to permit the direct discharge of the vapors from the drying zone 37 into the atmosphere without production of serious nuisance.

I have suggested in this specification a number of possible explanations of surprisingly efficient action and results demonstrated with my novel method and apparatus. In doing so, I do not intend to be bound in any way by the correctness of any explanation or theory which I may have given. Quite on the contrary, I am fully aware that the theory of operation of my novel separator is, at best, imperfectly understood, but the improved results accomplished by my invention are in no way dependent upon such explanation or theory.

Although I have described above and shown in the drawings a preferred embodiment of my invention, I am aware that the invention may be embodied in many other forms. Thus, instead of the rectangular deposition chamber, other shapes may be used, although it is desirable so to regulate the shape with reference to the movement of the filter bed that a readjustment of its parts will not be required between the point of entrance of the influent for a substantial distance therebeyond along the line of flow. Also the shape of the tank in vertical section may be altered, e. g., the deposition chamber may conform to the shape of a single moving bed so that it will be substantially entirely filled with the carrier material, which will move therethrough without relative movement between its parts. Thus tanks of various shapes with parallel sides may be used. Also, in some cases, the relative direction of flow of the carrier material and/or of the sewage may be changed, although I have found substantial advantage in the upward spreading flow of the sewage and the downward flow of the carrier material with the sludge stratifications accumulating thereon. Although I have referred herein to a bed and a mass of carrier material, I am well aware that in some cases it may be more convenient to use several smaller units, either in series or in parallel, instead of one larger, and in such case the several units may be regarded as parts of the filtering mass.

What I claim is:

1. The method of separating entrained foreign matter from liquid sewage, trade waste, and the like which comprises passing a stream of the liquid upwardly through a bed of carrier material made up of pieces of sufficient size to permit ready flow of the liquid therethrough and substantially to avoid capillary action between the pieces of carrier material and mere straining thereby, and moving said carrier bed downwardly along the stream of liquid substantially without disturbing the relation of said pieces to one another within the bed while they are within said stream.

2. An apparatus for treatment of sewage and the like which comprises a bed of coarse pieces of carrier material, the pieces of which are sufficiently large to permit ready flow of sewage therebetween and substantially to avoid capillary action therebetween and mere straining thereby, a V-shaped tank for confining a stream of sewage to said bed having openings for admission and escape of sewage, means beyond said openings in the direction of travel of the carrier material for removing from the bed a section thereof, the sloping side of the V-shaped tank having a slope approximately equal to the talus slope of the carrier material and a baffle near the top of said sloping sides concaved on its underside and convex on its upper side, the edges of said baffle being designed to maintain a substantially uniform thickness of material supplied to the bed beneath the baffle.

3. The method of separating sludge from liquid in which it is entrained which comprises passing the liquid with the sludge solids suspended therein upwardly through the carrier material consisting of irregularly shaped pieces of sufficient size that the voids therebetween will be too large to effect mere capillary or straining action, supporting the carrier material so as to substantially prevent movement of the pieces thereof relative to adjacent pieces while the liquid is flowing thereover, repeatedly removing material upon which the sludge has deposited to such extent as to restrain the flow of liquid therethrough, and at each such removal maintaining undisturbed relative to one another, the pieces of the carrier material with deposit less dense than that removed, and replacing the removed material by fresh material of the same character placed in the liquid flow at the opposite end thereof from the removed material whereby the position of the carrier material relative to the flow of liquid is shifted progressively along said flow.

JOHN GORDON THOMAS.